US009244822B2

(12) United States Patent
Tamilmani et al.

(10) Patent No.: US 9,244,822 B2
(45) Date of Patent: Jan. 26, 2016

(54) AUTOMATIC OBJECT MODEL GENERATION

(71) Applicant: NetApp Inc., Sunnyvale, CA (US)

(72) Inventors: Anbumozhi Tamilmani, Bangalore (IN); Michael Andrew Stevens, Pittsburgh, PA (US)

(73) Assignee: NetApp Inc., Sunnyvale, CA (US)

( * ) Notice: Subject to any disclaimer, the term of this patent is extended or adjusted under 35 U.S.C. 154(b) by 66 days.

(21) Appl. No.: 14/106,986

(22) Filed: Dec. 16, 2013

(65) Prior Publication Data

US 2015/0169436 A1 Jun. 18, 2015

(51) Int. Cl.
*G06F 9/44* (2006.01)
*G06F 11/36* (2006.01)

(52) U.S. Cl.
CPC .................................. *G06F 11/3696* (2013.01)

(58) Field of Classification Search
None
See application file for complete search history.

(56) References Cited

U.S. PATENT DOCUMENTS

| | | | |
|---|---|---|---|
| 7,340,747 B1* | 3/2008 | Zeliger et al. | 719/328 |
| 7,788,238 B2* | 8/2010 | Gabriel et al. | 707/695 |
| 8,930,888 B2* | 1/2015 | Canches | G06F 8/315 705/22 |
| 2003/0184585 A1* | 10/2003 | Lin et al. | 345/763 |
| 2005/0223360 A1* | 10/2005 | Seeman et al. | 717/124 |
| 2008/0052308 A1* | 2/2008 | Zhang | G06Q 10/10 |
| 2012/0005645 A1* | 1/2012 | Kopp et al. | 717/104 |
| 2013/0007699 A1* | 1/2013 | Hoban et al. | 717/108 |

* cited by examiner

*Primary Examiner* — Isaac T Tecklu
*Assistant Examiner* — Daxin Wu
(74) *Attorney, Agent, or Firm* — LeClairRyan, a Professional Corporation

(57) ABSTRACT

A target device, such as a storage controller, may host an interface that manages objects, such as storage objects (e.g., logical unit numbers (LUNs), volumes, etc.), maintained by the storage controller. Accordingly, an object on the storage controller may be modeled as an object model, such as an object oriented library, based upon modeling information mined from the storage controller. The object model may be automatically generated, such as by discovering the interface to the object using available information in a command line interface (CLI) and/or an XML file (e.g., an XML help file). In this way, the object model may use hosted/exported interfaces to manage the object.

20 Claims, 10 Drawing Sheets

AUTOMATIC OBJECT MODEL GENERATION

BACKGROUND

A developer may deploy product code on a client device, such as deployment of product code for a storage application on a storage controller. The storage controller may comprise a storage application programming interface (API) configured to execute commands related to storage objects managed by the product code. The developer may attempt to run test code against the product code on the storage controller, such as test code to create a volume storage object. The test code may utilize test libraries, such as object oriented libraries, to access and/or interact with the product code and the storage API in order to create the volume storage object. Such test libraries are manually created based upon the product code. For example, a test library developer may read documentation for the storage API in order to identify functionality of the storage API, such as a create volume object method having a volume name attribute and a volume size attribute. In this way, the test library developer may manually generate a test library for the create volume object method, which may involve an extensive amount of manual resources or time, and may delay the developer of the test code that will utilize the test library. When a change occurs to the product code on the storage controller, the test library may be unusable until the test library is manually updated, and thus future testing may be delayed until the test library is updated.

DETAILED DESCRIPTION

Figure 1:
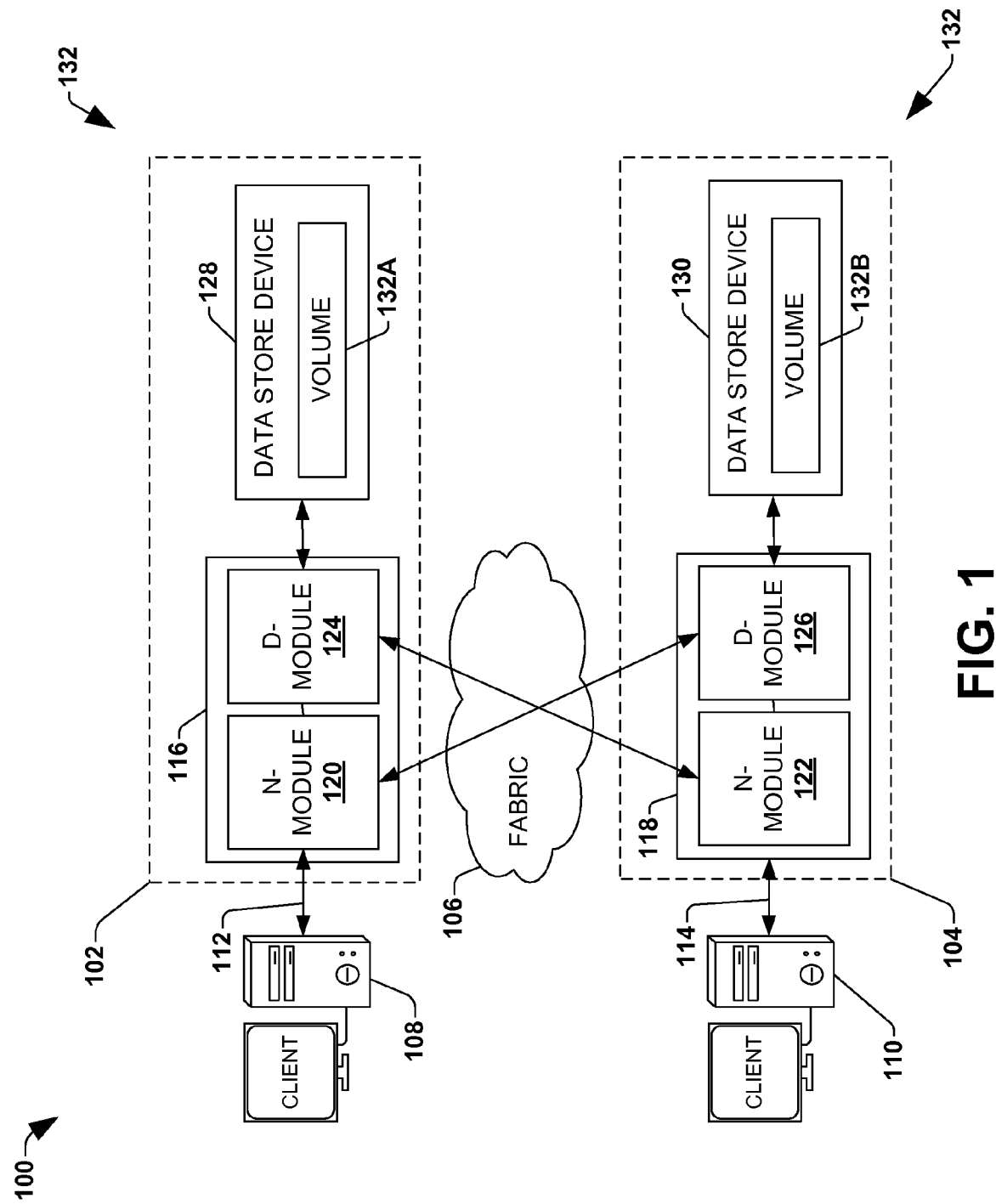
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

An object model, such as an object oriented library, may be automatically generated for an object (e.g., a storage object, such as a volume) so that test code may utilize the object model to remotely perform commands associated with the object (e.g., resize a volume on a storage controller). In an example, the object model is automatically generated in real-time, such as during runtime of the test code, which may mitigate unnecessary and/or costly references to a source tree associated with the object (e.g., a source tree of a user interface and/or API used to managed objects, such as volumes). In an example, the object model may comprise one or more methods used to manipulate an object, such as a rename method or a delete method. The object model may be generated by accessing a target device, such as the storage controller, and evaluating an interface (e.g., a volume command interface) to identify modeling information about the object (e.g., methods and/or attributes for volumes). In this way, the object model may be created based upon the modeling information. The object model may provide remote access to perform commands, related to the object, on the target device.

To provide context for automatically generating an object model for an object, FIG. 1 illustrates an embodiment of a clustered network environment 100. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems 102 and 104 that are coupled over a cluster fabric 106, such as a computing network embodied as a private Infiniband or Fibre Channel (FC) network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more clients 108, 110 which may comprise, for example, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the clients 108, 110 may be general-purpose computers running applications, and may interact with the data storage systems 102, 104 using a client/server model for exchange of information. That is, the client may request data from the data storage system, and the data storage system may return results of the request to the client via one or more network connections 112, 114.

The nodes 116, 118 on clustered data storage systems 102, 104 can comprise network or host nodes that are interconnected as a cluster to provide data storage and management services, such as to an enterprise having remote locations, for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

As illustrated in the exemplary environment 100, nodes 116, 118 can comprise various functional components that coordinate to provide distributed storage architecture for the cluster. For example, the nodes can comprise a network module 120, 122 (e.g., N-Module, or N-Blade) and a data module 124, 126 (e.g., D-Module, or D-Blade). Network modules 120, 122 can be configured to allow the nodes 116, 118 to connect with clients 108, 110 over the network connections 112, 114, for example, allowing the clients 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of N and D modules, other embodiments may comprise a differing number of these modules. For example, there may be a plurality of N and/or D modules interconnected in a cluster that does not have a one-to-one correspondence between the N and D modules. That is, different nodes can have a different number of N and D modules, and the same node can have a different number of N modules than D modules.

Further, a client 108, 110 can be networked with the nodes 116, 118 in the cluster, over the networking connections 112, 114. As an example, respective clients 108, 110 that are networked to a cluster may request services (e.g., exchanging of information in the form of data packets) of a node 116, 118 in the cluster, and the node 116, 118 can return results of the requested services to the clients 108, 110. In one embodiment, the clients 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the clients 108, 110 can utilize the data storage systems 102, 104 to store and retrieve data from the volumes 132. In this embodiment, for example, the client 108 can send data packets to the N-module 120 in the node 116 within data storage system 102. The node 116 can forward the data to the data storage device 128 using the D-module 124, where the data storage device 128 comprises volume 132A. In this way, in this example, the client can access the storage volume 132A, to store and/or retrieve data, using the data storage system 102 connected by the network connection 112. Further, in this embodiment, the client 110 can exchange data with the N-module 122 in the host 118 within the data storage system 104 (e.g., which may be remote from the data storage system 102). The host 118 can forward the data to the data storage device 130 using the D-module 126, thereby accessing volume 132B associated with the data storage device 130.

It may be appreciated that in one example, one or more object modeling components for automatically generating object models and/or one or more command execution components for using object models to implement commands for objects on target devices may be implemented within the clustered network environment 100. For example, an object modeling component and/or a command execution component may be hosted by client 108 and/or client 110, and may model objects and/or perform commands on objects stored by node 116 and/or node 118.

Figure 2:
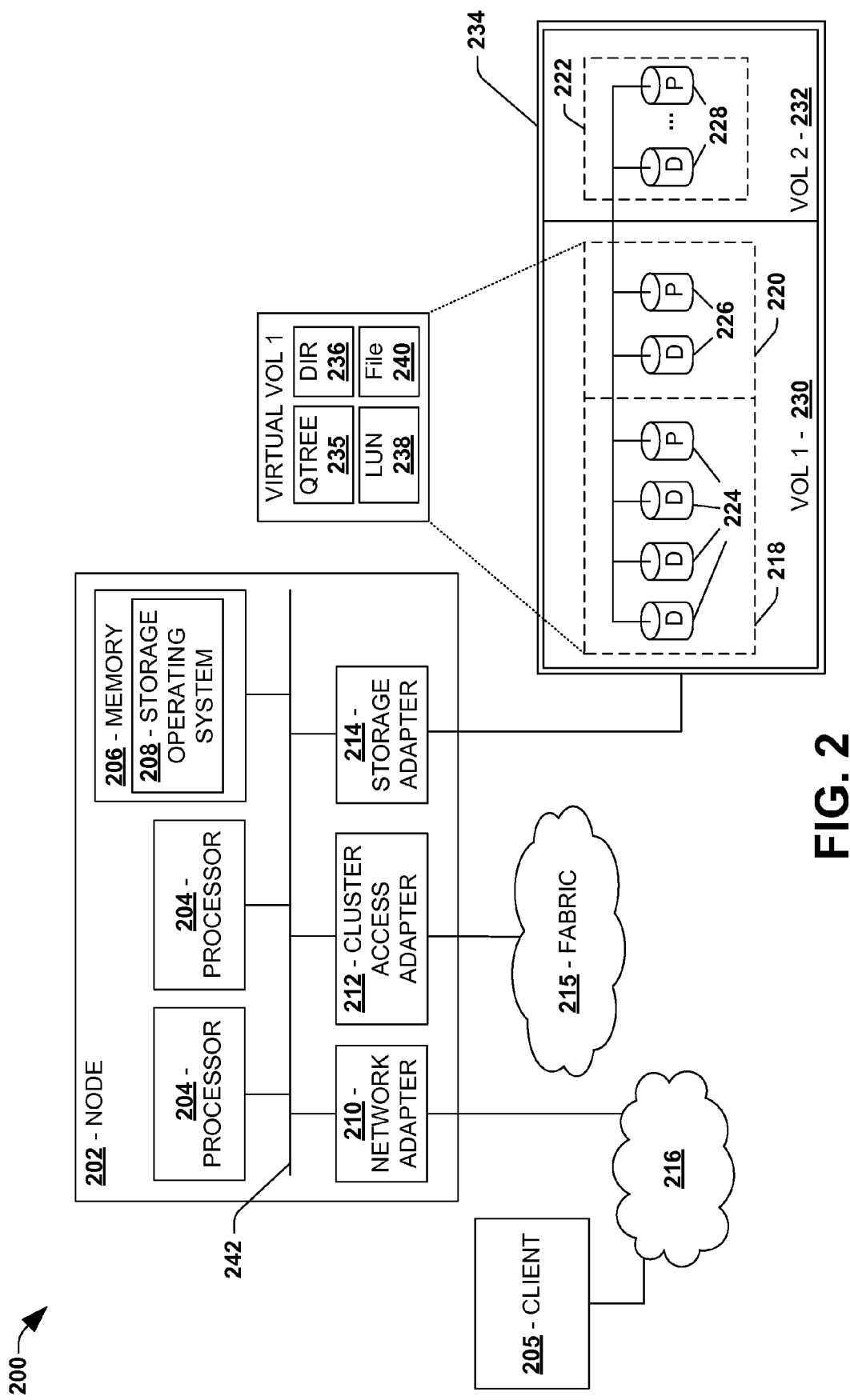
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A client 205 (e.g., 108, 110 in FIG. 1) can be connected to the node 202 over a network 216, for example, to provides access to files and/or other data stored on the data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the host 202 can respond to client requests to manage data on the data storage device 234 (e.g., or additional clustered devices) in accordance with these client requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software program code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing program instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a client 205 over a computer network 216, which may comprise, among other things, a point-to-point connection or a shared medium, such as a local area network. The client 205 (e.g., 108, 110 of FIG. 1) may be a general-purpose computer configured to execute applications. As described above, the client 205 may interact with the data storage system 200 in accordance with a client/host model of information delivery.

The storage adapter 214 cooperates with the operating system 208 executing on the host 202 to access information requested by the client 205. The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the client 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume, which may also be referred to as a "traditional volume" in some contexts, corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the host 202 connects to a volume 230, 232 through the storage adapter 214, a connection between the host 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that in one example, one or more object modeling components for automatically generating object models and/or one or more command execution components for using object models to implement commands for objects on target devices may be implemented within network 216 or any other type of network (e.g., a home network, a corporate network, a first device connected to second device using a cable or a wireless connection, etc.). For example, an object modeling component and/or a command execution component may be hosted by client 205, and may model objects and/or perform commands on objects stored by node 202.

Figure 3:
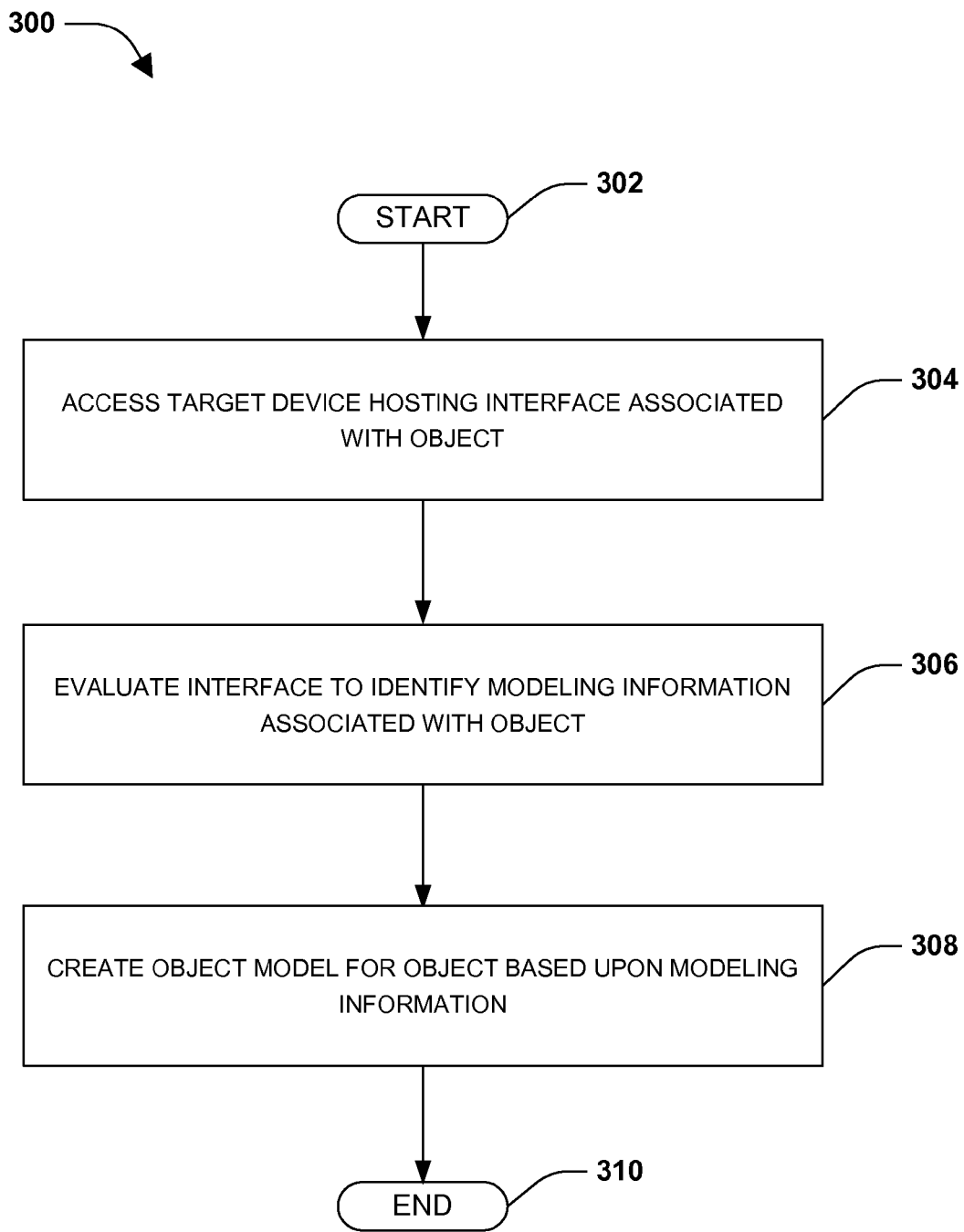
FIG. 3 is a flow chart illustrating an exemplary method of automatically generating an object model for an object.

One embodiment of automatically generating an object model for an object is illustrated by an exemplary method 300 of FIG. 3. At 302, the method starts. A target device, such as a storage controller (e.g., nodes 116/118 of FIG. 1 and/or node 202 of FIG. 2), may host an interface associated with an object. The interface may comprise a command line interface, an application programming interface (API), and/or any other type of interface associated with objects, such as storage objects (e.g., a volume object, a logical unit number (LUN) object, a directory object, a storage protocol object, a communication object, an object oriented programming object, and/or any other type of data object). The interface may expose various functionality for managing objects, such as a create object method, a delete object method, a modify object method, and/or attributes associated with such methods (e.g., a name attribute, a size attribute, an owner attribute, etc.).

At 304, the target device may be accessed for automatic modeling of the object managed by the interface. In an example, the object may be dynamically modeled at runtime in response to identifying a command call associated with the object (e.g., responsive to a test code developer issuing a create volume command call from a device, a volume object on the target device may be modeled to create a volume object model that may be used to facilitate performance of a create volume command on the target device). In an example, the target device may be remotely logged into, such as by the device used by the test code developer.

At 306, the interface may be evaluated to identify modeling information associated with the object. The modeling information may comprise a method invokable for the object (e.g., a create, delete, resize, rename, backup, snapshot creation, restore, and/or other methods for the volume object) and/or attributes utilized by such methods (e.g., a name attribute, a size attribute, etc.). In an example, instructional help information provided by the interface may be parsed to identify the modeling information (e.g., a "/help" command may be issued to a command line interface in order to receive instructional help information that may be parsed to identify methods and/or attributes supported by the command line interface for the object). In another example, a file associated with the interface (e.g., a help xml file used by the interface to provide instructional help information) may be parsed to identify the modeling information, such as a parameter, a parameter type, a privilege level, a return type, a description, and/or other modeling information specified by the file. In another example, a source tree of an application on the target device (e.g., a source tree for an application that provides the interface) may be referenced to identify the modeling information (e.g., the source tree may be referenced to identify paths to files, such as xml files, comprising command or method defintions supported for the object, such as a build root $build_root/final/image/mroot/help/help_xml/ for a help xml file).

At 308, an object model for the object is created based upon the modeling information. In an example, the object model is dynamically created during runtime of test code (e.g., a command call comprising test instructions) that is to access the target device to test functionality associated with the object (e.g., a delete volume method). In an example, the object model may be an abstract representation of the object, as opposed to a logical equivalent. In an example, the object model may not represent a local object, but may provide remote access to manipulate the object or an element thereof that is owned and/or managed by the target device (e.g., a device may be provided with remote access, through the object model, to an object on a storage controller). That is, the object model may provide remote access to perform a command, associated with the object, on the target device. In an example, the object model comprises an object orientated library that models the object. The object oriented library may specify a method and/or attributes of the method invokable for the object (e.g., a create volume method comprising a name attribute and a size attribute). In an example, the object model may be annotated with additional functionality for the object (e.g., a change owner method comprising a prior owner attribute and a new owner attribute).

In an example, a command call may be received from a device (e.g., a device remote from the target device). The command call may correspond to a method for the object (e.g., a create volume method). The object model may be used to translate the command call into a target API format used by an API on the target device (e.g., a volume management API), resulting in a translated command call. The translated command call may be used to invoke (e.g., remotely invoke from the device) the API on the target device to perform the method. In this way, the object model may be utilized to perform commands for an object on the target device.

In an example of creating the object model, the object model may be incrementally created and/or updated with modeling information based upon what methods are requested by command calls. For example, an empty namespace package may be created for the object (e.g., created on a device remote to the target device). Responsive to receiving a first command call for the object (e.g., a resize volume command call received from the device), the object model may be created to comprise a first method definition for a first method associated with the first command call (e.g., a resize volume method may be included within the object model). The empty namespace package may be populated with the object model to create a populated namespace package. Responsive to receiving a second command call for the object (e.g., a rename command call received from the device), the object model within the populated namespace package may be updated to comprise a second method definition for a second method associated with the second command call (e.g., a rename volume method may be included within the object model). In this way, the object model may be updated with methods as such methods are requested by command calls, which may mitigate unnecessary and/or costly references to the interface on the target device. At 310, the method ends.

Figure 4A:
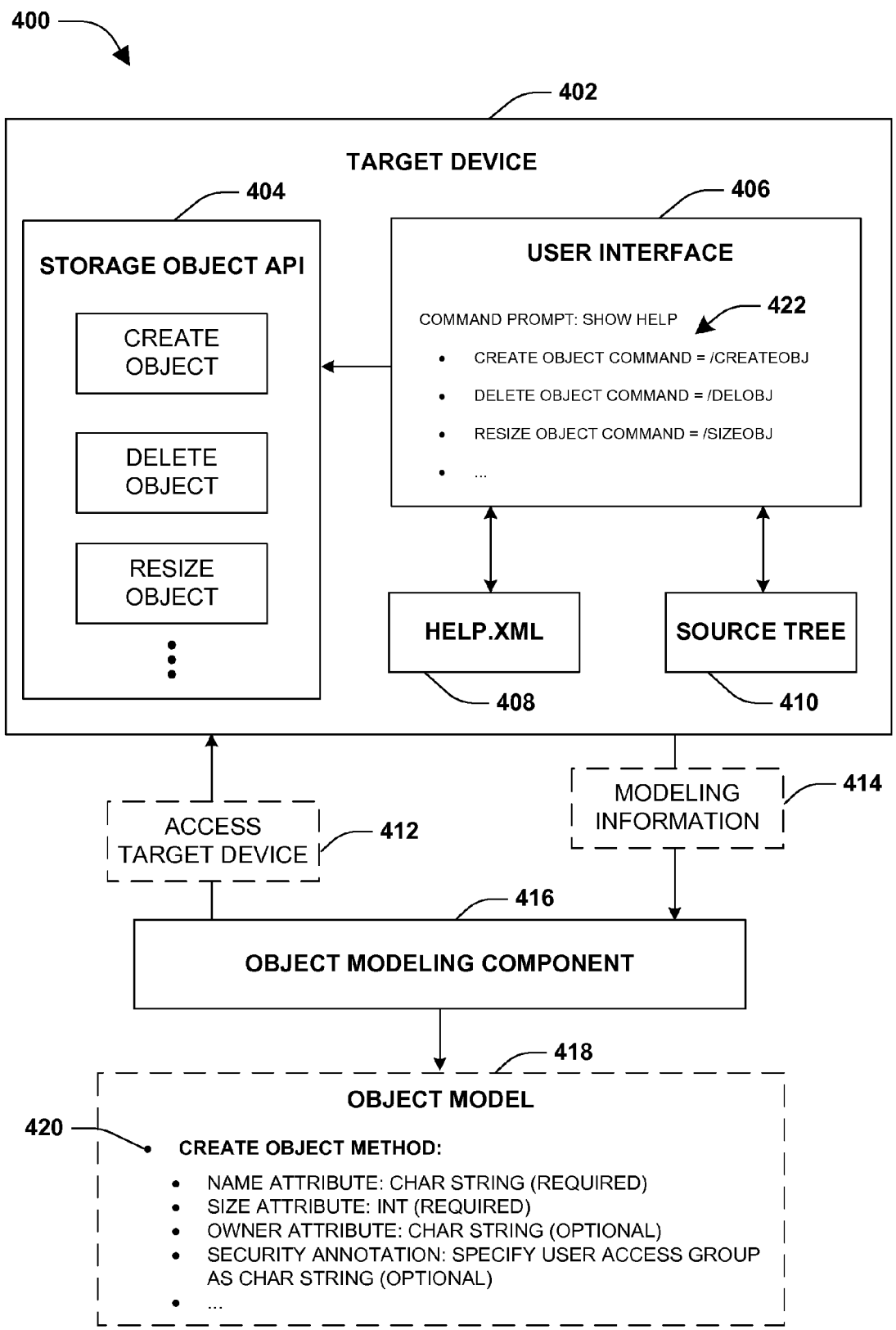
FIG. 4A is a component block diagram illustrating an exemplary system for automatically generating an object model for an object.

FIG. 4A illustrates an example of a system 400 for automatically generating an object model 418 for an object. A target device 402 may comprise a user interface 406, such as a command line interface, and/or a storage object API 404 configured to manage an object, such as a LUN object. The storage object API 404 may provide create object functionality, delete object functionality, resize object functionality, and/or other functionality. The user interface 406 may be associated with a source tree 410 that may provide location information (e.g., a path) for modeling information, such as a help.xml file 408 used by the user interface 406 to provide instruction help information 422.

The system 400 may comprise an object modeling component 416. The object modeling component 416 may be configured to access 412 the target device 402 to obtain object modeling information 414. For example, the object modeling component 416 may evaluate the storage object API 404, the user interface 406, the source tree 410, the help.xml file 408, and/or the instructional help information 422 to identify the object modeling information 414. The object modeling component 416 may create the object model 418 based upon the modeling information 414. For example, object modeling component 416 may populate the object model 418 with a create object method 420 comprising a name attribute, a size attribute, an owner attribute, and/or other attributes derived from the modeling information 414 about the create object method 420. In an example, the object model 418 may be annotated with additional functionality for the object, such as a method or an attribute (e.g., a security annotation attribute for the create object method 420). In an example, the modeling information 414 and/or the object model 418 may correspond to the create object method 420 (e.g., but not a delete object method or a resize object method) because a command call from a device may have requested remote access to the target device 402 to perform the create object method 420. The object model 418 may be updated based upon command calls requesting remote access to the target device 402 to perform other methods, such as a delete object method (e.g., FIG. 4B).

Figure 4B:
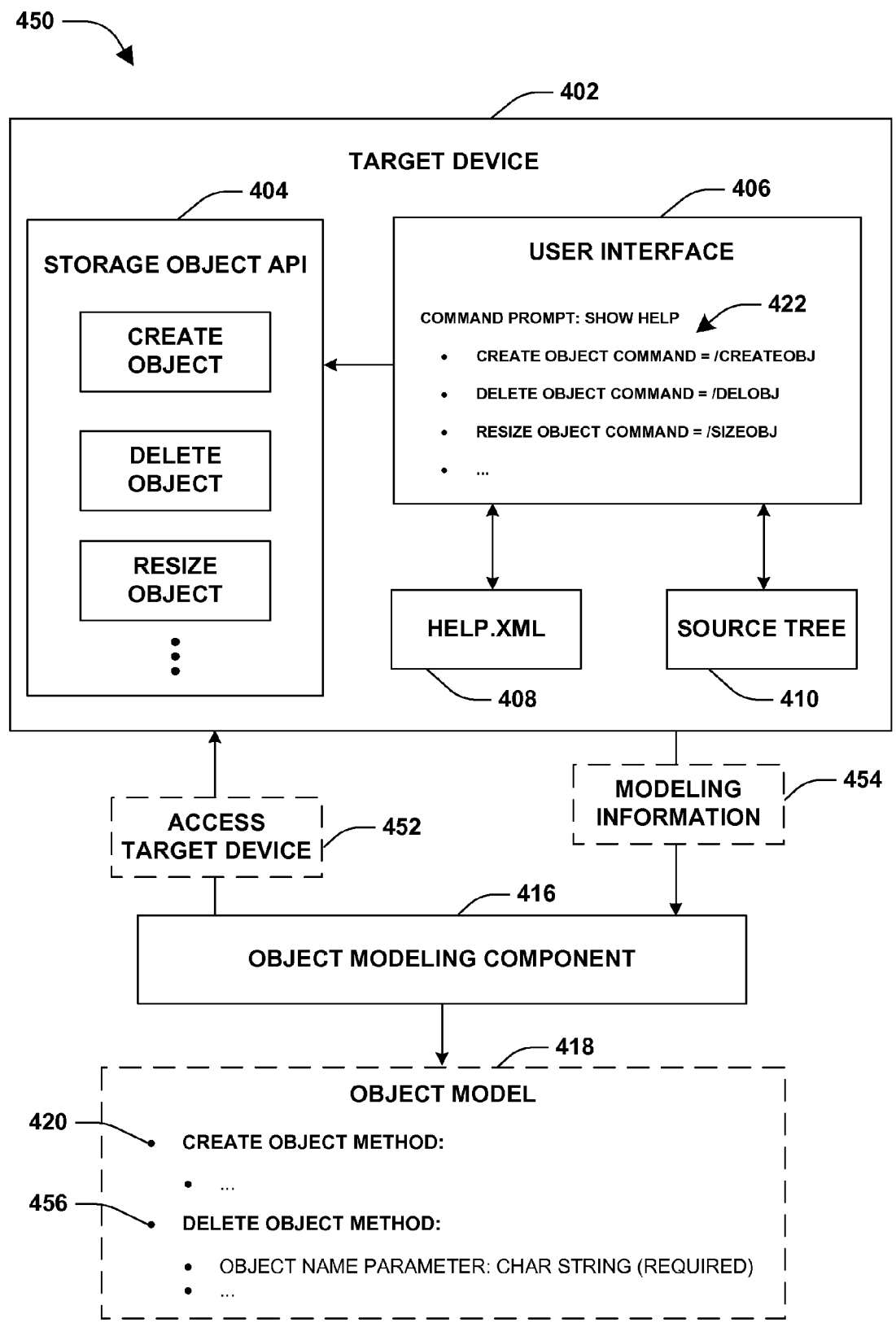
FIG. 4B is a component block diagram illustrating an exemplary system for updating an object model based upon a command call.

FIG. 4B illustrates an example of a system 450 for updating an object model 418 based upon a command call. In an example, the object model 418 may have been created by an object modeling component 416 for an object on a target device 402 (e.g., FIG. 4A). Responsive to receiving a command call to remotely access the target device 402 to perform a delete object method, the object modeling component 416 may access 452 the target device 402 to identify modeling information 454 associated with the object, such as a delete object method 418 (e.g., delete object functionality provided by a storage object API 404). The object modeling component 416 may update the object model 418 to comprise the delete object method 456 derived from the modeling information 454. In this way, the command call may utilize the object model 418 to remotely access the target device 402 in order to invoke a create object method 420 and/or the delete object method 456 on the target device 402, such as by invoking the storage object API to invoke corresponding functionality (e.g., FIG. 5).

Figure 5:
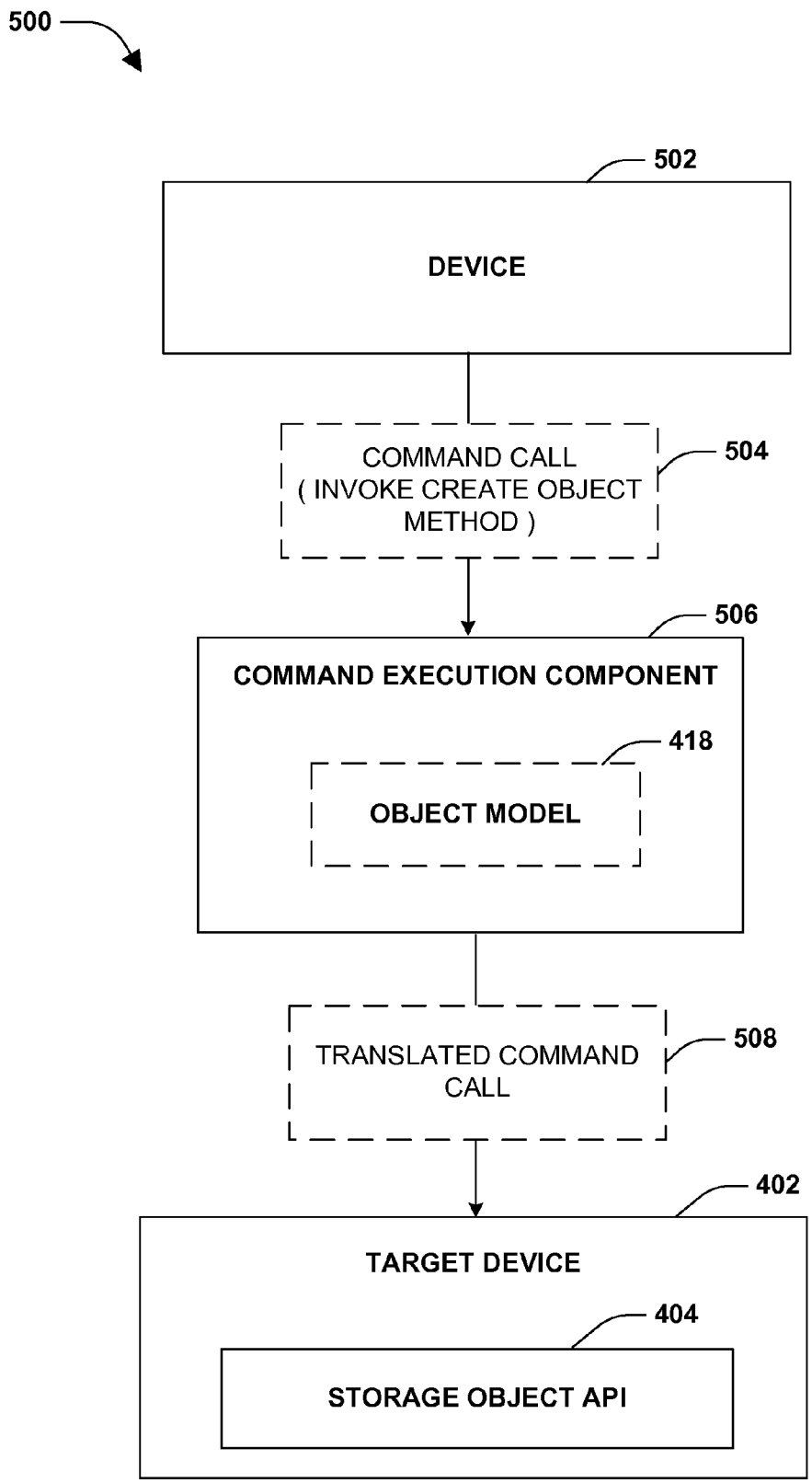
FIG. 5 is a component block diagram illustrating an exemplary system for providing remote access to perform a command, associated with an object, on a target device.

FIG. 5 illustrates an example of a system 500 for providing remote access to perform a command, associated with an object, on a target device 402. In an example, an object model 418 may have been created by an object modeling component 416 (e.g., FIGS. 4A and 4B). The system 500 may comprise a command execution component 506 that has access to the object model 418 (e.g., the command execution component 506 and/or the object model 418 may be hosted on a device 502, and may be configured to provide remote access from the device 502 to the target device 402). A command call 504 may be received from the device 502. The command call 504 may correspond to a method for an object modeled by the object model 418, such as a create object method 504. The command execution component 506 may utilize the object model 418 to translate the command call 504 (e.g., from a format understandable to the device 502, such as an ARM-based instruction) into a target API format used by an API on the target device 402, resulting in a translated command call 508. For example, the command execution component 506 may identify a create object method definition within the object model 418. The create object method definition may specify one or more attributes utilized by a create object method 420 (e.g., FIG. 4A), which may be implemented by a storage object API 404 on the target device 402. Accordingly, the command execution component 506 may format the command call 504 according to the create object method definition that corresponds to an API format used by the storage object API 404. The command execution component 506 may use the translated command call 508 to invoke the storage object API 404 to perform the create object method 420 (e.g., FIG. 4A).

Figure 6:
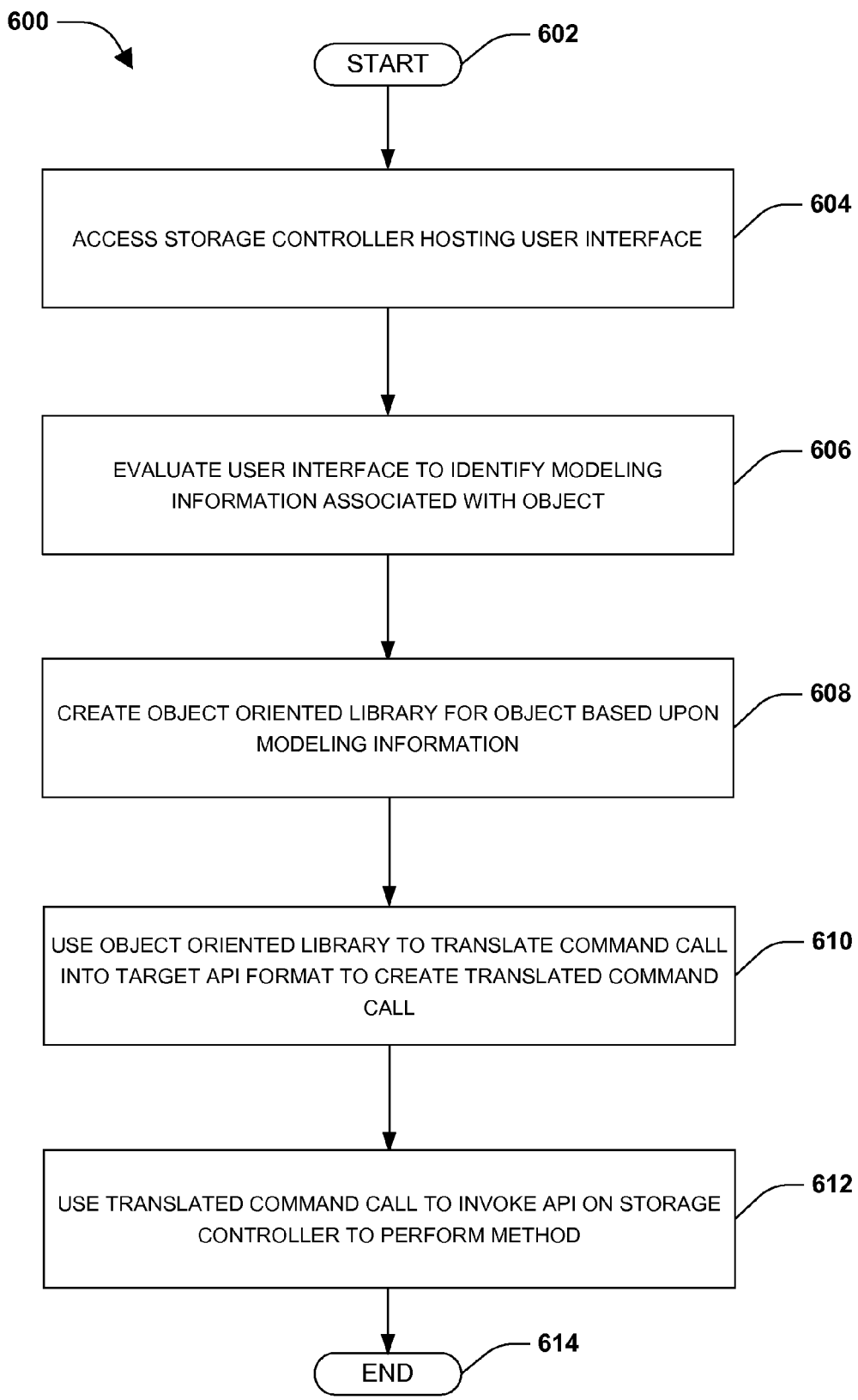
FIG. 6 is a flow chart illustrating an exemplary method of automatically generating an object oriented library for an object.

One embodiment of automatically generating an object oriented library for an object is illustrated by an exemplary method 600 of FIG. 6. At 602, the method starts. At 604, a storage controller hosting a user interface associated with an object may be accessed (e.g., a storage controller interface may provide command line access to manage logical unit numbers (LUNs) stored within one or more storage devices managed by the storage controller). A 606, the user interface may be evaluated to identify modeling information associated with the object (e.g., a help file, defining methods, attributes, and/or other descriptive information for LUNs, may be parsed to identify the modeling information). The modeling information may comprise a method definition for a method associated with the object (e.g., a resize LUN method). The method definition may specify an attribute used by the method (e.g., a LUN name attribute, a LUN size attribute, etc.).

At 608, an object orientated library, such as an object model, for the object may be created based upon the modeling information. The object oriented library may provide remote access to perform a command, associated with object, on the storage controller (e.g., a device may utilize the object oriented library to remotely access the storage controller to perform a resize LUN command). In an example, a command call corresponding to the method definition may be received from a device (e.g., the command call may be formatted according to the device, such as an instruction set, a processor instruction type, or protocol used by the device). At 610, the object oriented library may be used to translate the command call into a target API format used by an API on the storage controller to create a translated command call. At 612, the translated command call may be used to invoke the API on the storage controller to perform the method. In this way, the command call, such as test code, may be executed against the storage controller utilizing the object orientated library created on the fly during runtime of the test code. At 614, the method ends.

Figure 7:
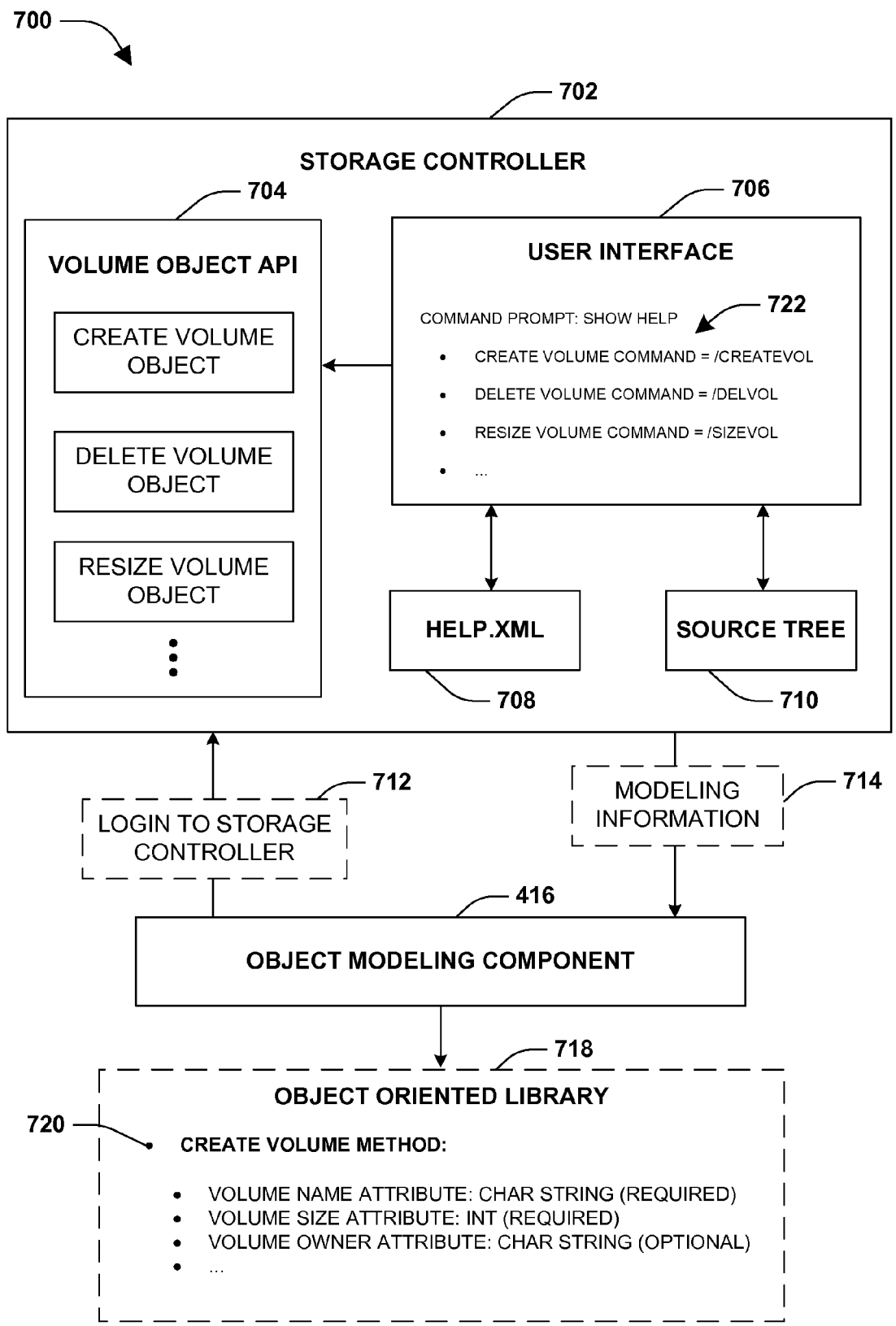
FIG. 7 is a component block diagram illustrating an exemplary system for automatically generating an object oriented library for an object.

FIG. 7 illustrates an example of a system 700 for automatically generating an object oriented library 718 for an object. A storage controller 702 may comprise a user interface 706, such as a command line interface, and/or a volume object API 704 configured to manage an object, such as a volume object. The volume object API 704 may provide create volume object functionality, delete volume object functionality, resize volume object functionality, and/or other functionality. The user interface 706 may be associated with a source tree 710 that may provide location information (e.g., a path) for modeling information, such as a help.xml file 708 used by the user interface 706 to provide instruction help information 722.

The system 700 may comprise an object modeling component 416. The object modeling component 416 may be configured to access 712, such as logging into, the storage controller 702 to obtain object modeling information 714. For example, the object modeling component 416 may evaluate the volume object API 704, the user interface 706, the source tree 710, the help.xml file 708, and/or the instructional help information 722. The object modeling component 416 may create the object oriented library 718 based upon the modeling information 714. For example, object modeling component 416 may populate the object oriented library 718 with a create volume method 720 comprising a volume name attribute, a volume size attribute, a volume owner attribute, and/or other attributes derived from the modeling information 714 about the create volume method 720. In an example, the object oriented library 718 may be annotated with additional functionality for the volume object, such as a method or an attribute (e.g., a migration volume method having a source location attribute and a destination location attribute). In an example, the modeling information 714 and/or the object oriented library 718 may correspond to the create volume method 720 (e.g., but not a delete volume method or a resize volume method) because a command call from a device may have requested remote access to the storage controller 720 to perform the create volume method.

Figure 8:
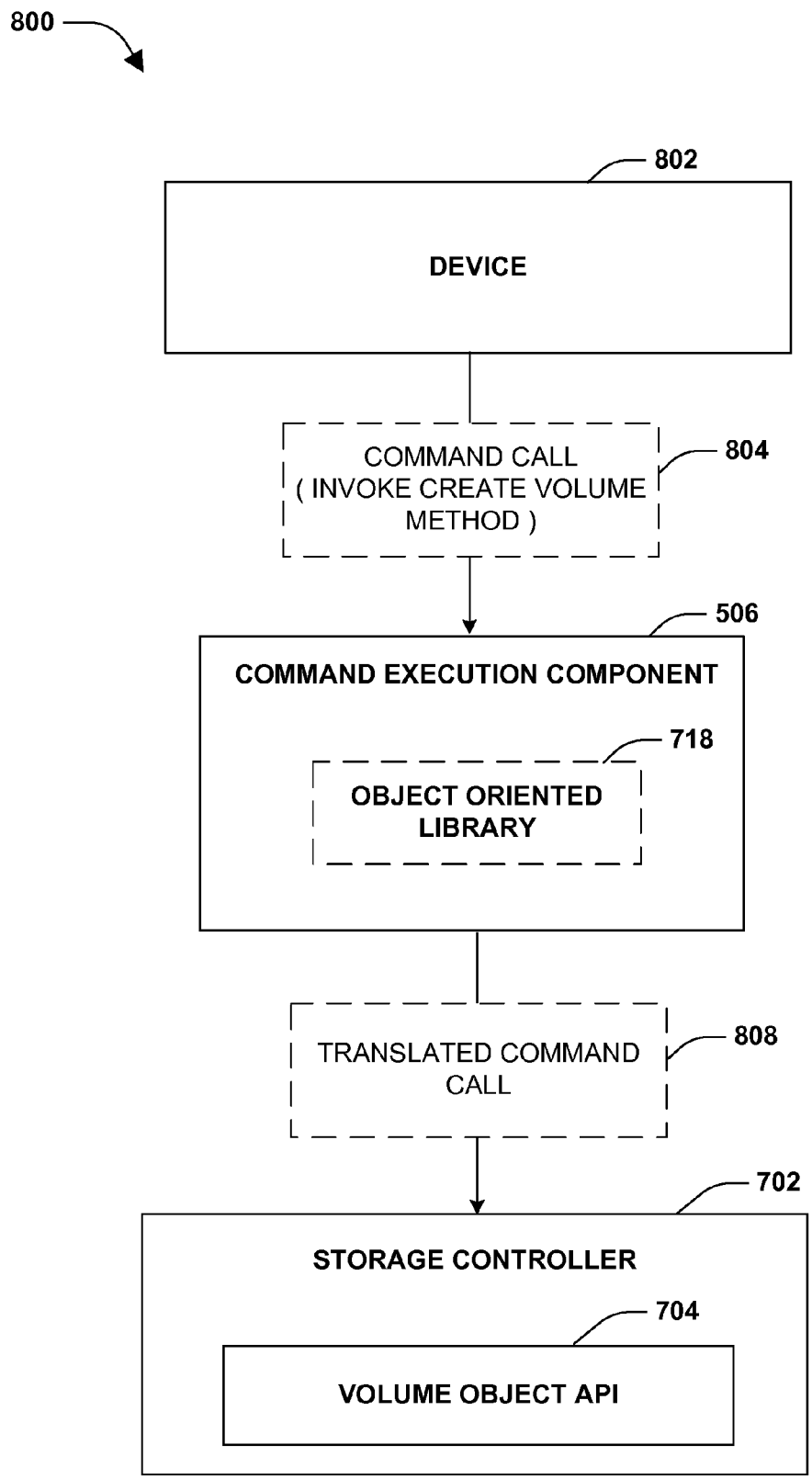
FIG. 8 is a component block diagram illustrating an exemplary system for providing remote access to perform a command, associated with an object, on a storage controller.

FIG. 8 illustrates an example of a system 800 for providing remote access to perform a command, associated with an object, on a storage controller 702. In an example, an object oriented library 718 may have been created by an object modeling component 416 (e.g., FIG. 7). The system 800 may comprise a command execution component 506 that has access to the object oriented library 718 (e.g., the command execution component 506 and/or the object oriented library 718 may be hosted on a device 802, and may be configured to provide remote access from the device 802 to the storage controller 702). A command call 804 may be received from the device 802. The command call 804 may correspond to a method for a volume object modeled by the object oriented library 718, such as a create volume method 720. The command execution component 506 may utilize the object oriented library 718 to translate the command call 804 (e.g., from a format understandable to the device 502, such as an ARM-based instruction) into a target API format used by a volume object API 704 on the storage controller 702, resulting in a translated command call 808. For example, the command execution component 506 may identify a create volume method definition within the object oriented library 718. The create volume method definition may specify one or more attributes utilized by the create volume method 720 (e.g., FIG. 7), which may be implemented by the volume object API 704 on the storage controller. Accordingly, the command execution component 506 may format the command call 804 according to the create volume method definition that corresponds to an API format used by the volume object API 704. The command execution component 506 may use the translated command call 808 to invoke the volume object API 704 to perform the create volume method (e.g., FIG. 7).

Figure 9:
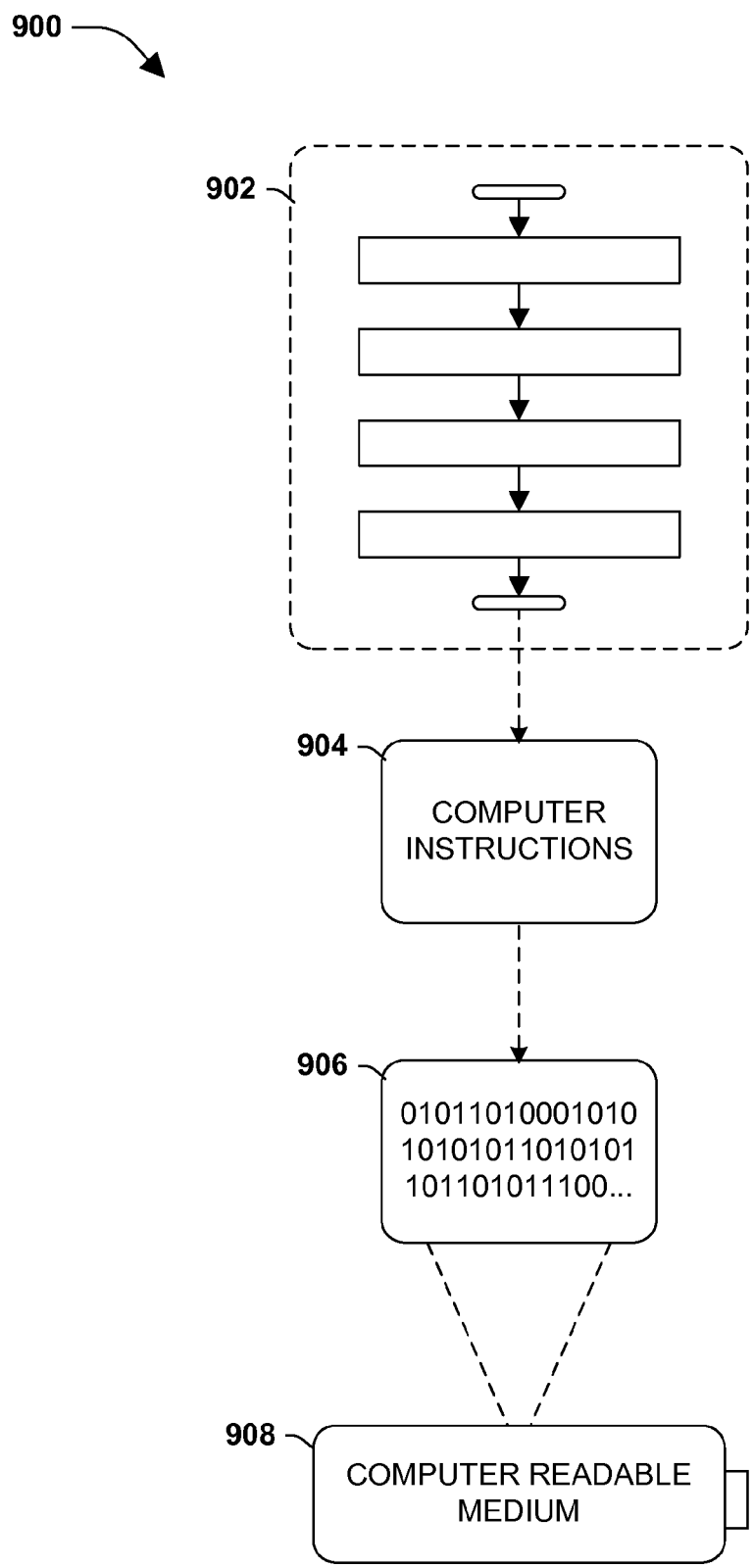
FIG. 9 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 9, wherein the implementation 900 comprises a computer-readable medium 908, such as a CD-R, DVD-R, flash drive, a platter of a hard disk drive, etc., on which is encoded computer-readable data 906. This computer-readable data 906, such as binary data comprising at least one of a zero or a one, in turn comprises a set of computer instructions 904 configured to operate according to one or more of the principles set forth herein. In some embodiments, the processor-executable computer instructions 904 are configured to perform a method 902, such as at least some of the exemplary method 300 of FIG. 3 and/or at least some of the exemplary method 600 of FIG. 6, for example. In some embodiments, the processor-executable instructions 904 are configured to implement a system, such as at least some of the exemplary system 400 of FIG. 4A, at least some of the exemplary system 450 of FIG. 4B, at least some of the exemplary system 500 of FIG. 5, at least some of the exemplary system 700 of FIG. 7, and/or at least some of the exemplary system 800 of FIG. 8, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, a program, or a computer. By way of illustration, both an application running on a controller and the controller can be a component. One or more components residing within a process or thread of execution and a component is localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for automatically generating an object model for an object, comprising:
   creating an empty namespace package for an object; and
   responsive to receiving a first command call for the object:
      accessing a target device hosting an interface associated with the object;
      evaluating, based upon the first command call, the interface to identify modeling information associated with the object;
      creating an object model for the object based upon the modeling information; and
      populating the empty namespace package with the object model to create a populated namespace package, the object model comprising a first method definition for a first method associated with the first command call, the object model providing remote access to perform a command invoking the first method on the target device.

2. The method of claim 1, the target device comprising a storage controller.

3. The method of claim 1, the interface comprising at least one of a command line interface or an application programming interface (API).

4. The method of claim 1, the modeling information comprising an attribute utilized by the first method.

5. The method of claim 1, the object model comprising an object oriented library that models the object, the object oriented library specifying the first method.

6. The method of claim 1, the modeling information comprising at least one of a create object method, a delete object method, or a modify object method.

7. The method of claim 1, the evaluating comprising:
   parsing an xml file associated with the interface to identify the modeling information, the modeling information comprising at least one of a parameter, a parameter type, a privilege level, a return type, or a description parsed from the xml file.

8. The method of claim 1, the evaluating comprising:
   parsing instructional help information provided by the interface to identify the modeling information.

9. The method of claim 1, the evaluating comprising:
   referencing a source tree of an application on the target device to identify the modeling information.

10. The method of claim 1, the creating comprising:
    dynamically creating the object model at runtime.

11. The method of claim 1, comprising:
responsive to receiving, from a device, a second command call corresponding to the first method;
using the object model to translate the second command call into a target application programming interface (API) format used by an API on the target device to create a translated command call; and
using the translated command call to invoke the API on the target device to perform the first method.

12. The method of claim 1, the accessing comprising:
remotely logging into the target device from a device remote to the target device.

13. The method of claim 1, the creating comprising:
annotating the object model with additional functionality for the object.

14. The method of claim 1, comprising:
responsive to receiving a second command call for the object, updating the object model, within the populated namespace package, to comprise a second method definition for a second method associated with the second command call.

15. The method of claim 1, the command comprising test instructions.

16. A system for automatically generating an object model for an object, comprising:
a hardware processor; and
an object modeling component implemented via the hardware processor and configured to:
create an empty namespace package for an object; and
responsive to receiving a first command call for the object:
access a target device hosting an interface associated the object;
evaluate, based upon the first command call, the interface to identify modeling information associated with the object;
create an object model for the object based upon the modeling information; and
populate the empty namespace package with the object model to create a populated namespace package, the object model comprising a first method definition for a first method associated with the first command call, the object model providing remote access to perform a command invoking the first method on the target device.

17. The system of claim 16, comprising:
a command execution component configured to:
responsive to receiving, from a device, a second command call corresponding to the first method:
use the object model to translate the second command call into a target application programming interface (API) format used by an API on the target device to create a translated command call; and
use the translated command call to invoke the API on the target device to perform the first method.

18. The system of claim 16, the modeling information comprising an attribute utilized by the first method.

19. A non-transitory computer readable medium comprising instructions that when executed perform a method for automatically generating an object model for an object, comprising:
creating an empty namespace package for an object; and
responsive to receiving a first command call for the object:
accessing a storage controller hosting a user interface associated with the object;
evaluating, based upon the first command call, the user interface to identify modeling information associated with the object;
creating an object model oriented library for the object based upon the modeling information; and
populating the empty namespace package with the object model to create a populated namespace package, the object model comprising a first method definition for a first method associated with the first command call, the object oriented library providing remote access to perform a command invoking the first method on the storage controller.

20. The non-transitory computer readable medium of claim 19, the creating comprising:
dynamically creating the object model at runtime.

* * * * *